United States Patent [19]
Völker et al.

[11] Patent Number: 5,367,305
[45] Date of Patent: Nov. 22, 1994

[54] METHOD AND APPARATUS FOR CONTROLLING AN ACTIVE ANTENNA

[75] Inventors: Michael Völker, Markdorf; Stefan Weiss, Friedrichshafen; Rudolf Zahn, Markdorf, all of Germany

[73] Assignee: Dornier GmbH, Germany

[21] Appl. No.: 96,857

[22] Filed: Jul. 26, 1993

Related U.S. Application Data

[63] Continuation of Ser. No. 854,976, Mar. 20, 1992, abandoned.

[30] Foreign Application Priority Data

Mar. 20, 1991 [DE] Germany ............... 4109067

[51] Int. Cl.$^5$ ............................................. H01Q 3/22
[52] U.S. Cl. ................... 342/368; 342/372; 342/375
[58] Field of Search ............... 342/368, 371, 372, 375, 342/376; 356/349; 359/182, 188, 191, 326, 578, 618, 637

[56] References Cited

U.S. PATENT DOCUMENTS

| | | | |
|---|---|---|---|
| 3,005,960 | 10/1961 | Levenson | 342/372 |
| 3,766,558 | 10/1973 | Kuechken | 342/375 |
| 4,258,363 | 3/1981 | Bodner et al. | 342/368 |
| 4,583,096 | 4/1986 | Bellman et al. | 342/368 |
| 4,725,844 | 2/1988 | Goodwin et al. | 342/374 |
| 4,965,603 | 10/1990 | Hong et al. | 342/372 |

FOREIGN PATENT DOCUMENTS 3827589 2/1990 Germany.

OTHER PUBLICATIONS

Toughlian et al, "A Deformable Mirror-Based Optical Beamforming System for Phased Array Antennas" IEEE Photonics Tech. Letters, vol. 2 #6, Jun. 1990.
Koepf et al, "Optical Processor for Phased Array Antenna Beam Formation" SPIE vol. 477, Optical Technology for Microwave Applications (1984) pp. 75–81.
Voltage Controlled Optical/RF Phase Shifter–Journal of Lightwave Technology–vol. LT3–No. 5, Oct. 1985.
Optical Processor for Phased Array Antenna Beam Formation Gerhard Keopf–SPIE vol. 477–Optical Technology for Microwave Applications (1984) pp. 75–81.

*Primary Examiner*—Gregory C. Issing
*Attorney, Agent, or Firm*—Evenson, McKeown, Edwards & Lenahan

[57] ABSTRACT

A method of controlling an active antenna comprising a matrix of individual transmitting/receiving elements. Two optical frequencies are superposed to generate an optical beat signal in the microwave frequency range. After electrical/optical conversion the beat signal is fed with a defined phase and amplitude to the individual transmitting/receiving elements of the antenna.

22 Claims, 5 Drawing Sheets

TYPE A
LOBE SLEWING

TYPE B
LOBE SLEWING

CHANGE BEAT
FREQUENCY

CHANGE BEAT
FREQUENCY

METHOD AND APPARATUS FOR CONTROLLING AN ACTIVE ANTENNA

This is a continuation of application Ser. No. 07/854,976, filed Mar. 20, 1992 now abandoned.

BACKGROUND AND SUMMARY OF THE INVENTION

This invention relates to a method and apparatus for controlling an active antenna.

Active antennas of this type are used, for example, for SAR-sensors (Synthetic Aperture Radar). They are mounted on a vehicle, such as a satellite, in such a manner that their major lobe, points perpendicularly to the flight direction, laterally several degrees away from the nadir point. The elevation angle describes the beam steering about the longitudinal axis of the antenna in a plane perpendicularly to the flight direction. The azimuth angle indicates rotations of the vehicle (flight direction, normal line of antenna).

An active antenna normally comprises a rectangular n·m matrix of individual active transmitting/receiving elements. By means of a suitable phase and amplitude distribution among the independently controlled transmitting/receiving elements, the far zone of the overall antenna can be modelled within wide limits while the geometry of the antenna remains unchanged. It is thus possible to change the direction of the major transmitting or receiving lobe electronically without changing the position of the mechanical antenna. The transmitting/receiving elements which are arranged in a line along the flight direction form a so-called "elevation group"; while the transmitting/receiving elements arranged in an array form an "azimuth group".

By means of a suitable change of the phase distribution on the transmitting/receiving elements of the individual elevation groups, beam steering of the antenna lobe can be performed in the elevation direction; correspondingly, beam steering in the azimuth direction can be accomplished by suitable change of the phase distribution on the transmitting/receiving elements of the individual azimuth groups. Variable beam characteristics are advantageous in many cases. On the one hand, different areas on the ground may be illuminated at short successive measuring intervals. On the other hand, for receiving, it is possible to build large-area antennas with a high directivity and to follow with the major lobe in the direction from which the echo of the transmitted pulse originates. The overall sensitivity of the system will increase; the microwave transmitting output can be lowered in the case of the same requirements with respect to the interval between the wanted signal and the noise signal.

In the known arrangements, a centrally generated electric microwave signal for control of the antenna is guided with the correct phase and amplitude to the individual transmitting/receiving elements of the antenna. Coaxial or wave guide components are used for this purpose. These arrangements are mechanically complicated and relatively heavy. In addition, individual phase or amplitude adjustment is possible only in the proximity of the individual transmitting/receiving elements which, in turn, limits the control possibilities.

U.S. Pat. No. 4,965,603, describes a method for controlling the transmitting/receiving elements of an active antenna in which a beat signal generated from the beaming of two lasers is guided in glass fibers to the individual transmitting/receiving elements, and is converted into an electric signal there. The frequencies of the two lasers remain unchanged. A phase modulator is used for phase distribution of the beat signal.

U.S. Pat. No. 4,583,096, discloses a method for control of transmitting/receiving elements of an active antenna in which modulated optical generators (lasers) furnish digital optical information, transported by way of optical fibers, for the control of phase actuators which are mounted directly on the individual transmitting/receiving elements. In order for the phase shifting to be exclusively a function of the digital optical information, the lengths of the optical fibers must be identical for each transmitting/receiving element.

In U.S. Patent Document 4,725,844, a method for control of transmitting/receiving elements of an active antenna is disclosed in which the light of an intensity-modulated laser is distributed to the individual transmitting/receiving units by a glass fiber network with integrated star couplers. Phase differences are generated by phase actuators coupled into the individual optical paths.

In Koepf, G. A.: "Optical Processor for Phased-Array Antenna Beam Formation;" in *SPIE*, Vol. 477 "Optical Technology for Microwave Applications" (1984), Pages 75–81, a laser is used to control the transmitting/receiving elements of an active antenna which emits two beams of different frequencies. In order to achieve a desired amplitude and phase distribution., the first laser beam is modulated by an electro-optical crystal, passes through a Fourier transformation lens, and is finally superposed with the second laser beam. This method is also used in German Patent Document DE 38 27 589 A1, in which, however, an additional laser is used for each antenna diagram.

Soref, R. A.: "Voltage-Controlled Optical/RF Phase Shifter," in: *Journal of Lightwave Technology*, Vol. LT-3, No. 5, October 1985; Pages 992–998, describes another method for controlling transmitting/receiving elements of an active antenna, in which laser light of different frequencies is coherently superposed. The desired phase distribution is generated by actuators.

It is an object of the present invention to provide a method for controlling an active antenna, by which changes of the transmitting/receiving frequency as well as the beam sweep can be accomplished in a fast and highly flexible manner. The antenna in this case comprises a number of transmitting/receiving elements which are preferably arranged in lines (elevation groups) and arrays (azimuth groups). The direction of the antenna lobes is a function of the amplitude and phase distribution of the signal on the individual transmitting/receiving elements. The above object is achieved by the method according to the invention in which, the light of a first narrow-band coherent light source is divided into n·m optical paths (n being the number of elevation groups; m being the number of azimuth groups) of different lengths. The light of a second narrow-band coherent light source—like the first light source, preferably a laser—is divided into n·m optical paths of the same or different lengths. Each of the n·m optical paths which originates from first and second light sources is assigned to one of the n·m transmitting/receiving elements (n·m channels). The totality of these optical paths forms a so-called delay network. The coherence length of the light must be sufficiently large compared to the largest running time differences of the network.

In each case, the light on an optical path which originates from the first light source, is superposed with the light on an optical path which originates from the second light source. The (optical) frequencies of the two light sources are shifted with respect to one another in such a manner that the difference frequency is equal to the frequency desired for the control of the transmitting/receiving elements. For radar applications, it is in the microwave or dwarf wave frequency range. A signal having a beat frequency equal to the difference frequency is in each case obtained from the superposition. A total of n·m beat signals of the same beat frequency are obtained.

By means of optoelectronic converters ("O/E-converters"), such as photodetectors, the n·m beat signals are converted into electrical signals. An O/E-converter detects only the beat frequency and not the optical carrier frequency of the beat signal. In the case of the optoelectronic conversion, the phase relationship of the beat signals generated by passing through the individual optical paths is maintained.

The electrical signals, which may be further amplified after conversion, are guided to the individual transmitting/receiving elements of the antenna, one transmitting/receiving element being assigned to each of them.

For a given difference in optical path lengths, the phase and the frequency (independently of one another as well as coupled with one another) of the electrical signals present at the transmitting/receiving elements may be changed by the variation of the light frequencies, so that the antenna lobes are shaped and slewed and the transmitting/receiving frequency is also changed. It is essential for the method according to the invention that no static phase shift occur (that is, a phase difference due solely to given length differences of the optical paths). Rather only a dynamic phase shift (phase shift due to a frequency change, with length differences of the optical paths being constant) must be generated.

The optical path differences are chosen such that sensitivity of the phase with respect to absolute optical path frequency changes is as high as possible. The values for the optical path differences are therefore preferably in the range of several meters to single millimeters, and thus have magnitudes which are higher than the wavelengths of the light sources.

A special advantage of the invention lies in its ability to change the phase as well as the frequency of the signals present at the transmitting/receiving elements, by changing only one quantity (one of the two light source frequencies). Thus fast and very flexible control is achieved.

Additional actuators may be arranged on the optical paths to control the phase and the amplitude, for example, by way of the polarization direction.

In addition to the general case of the control of an antenna with n elevation groups and m azimuth groups (m and n larger than 1), the method according to the invention may also be used for antennas with only one elevation group (n=1) or only one azimuth group (m=1). In either case, beam steering of the antenna lobe is possible in only one direction.

Another special case is an antenna with only one transmitting/receiving element (n=1 and m=1). Although in such case a lobe beam steering is no longer possible, the transmitting and receiving frequency (beat signal) can be changed.

In an advantageous embodiment, the light is guided in optical fibers. The light originating from the light sources is fed into optical fiber networks and is branched into the individual optical paths by means of optical couplers, such as 2·2 couplers and/or star couplers. In yet another embodiment, the light is guided by way of open distances (free space configurations) with the distribution into the individual optical paths taking place, for example, by means of partially reflecting mirror, diffraction grids, or holograms.

To generate the beat signal, sufficiently narrow-band, controllable light sources must be available. Advantageously, laser-diode-pumped Nd:YAG-lasers may be used. In the case of an optical frequency of $2.8 \cdot 10^{14}$ Hz, their optical resonaters permit, by means of a control, line widths of below 1 Hz.

Because of thermal fluctuations in the millikelvin range, the line position changes rapidly. For example, the line position of a commercially available laser changes approximately 1 MHz per minute, due to the finite precision of the thermal control. Therefore a continuous outside control of the laser frequencies is required.

Although the approach using two separate lasers lead to good overall power efficiency, a single laser setup would lead to a simpler setup. G. A. Koepf (see the above mentioned SPIE proceeding) uses in his experimental optical processor one LASER. Its light is divided into two bundles. The first bundle contains light at the carrier frequency (the input light of the laser). The light of the second bundle is frequency shifted. The resulting beat note signal is controlled by the reference oscillator which drives the accusto-optic deflector. The nature of the driving signal is arbitrary, therefore it may contain modulated information on it.

With such a side band modulating setup the requirements to phase stability of the light source are low because—within the length of coherence—phase variations cancel themselves when the light interferes after a retarding network at the output.

The frequency shifting device—here the accusto-optic deflector—must feed only the light of one sideband of the modulated carrier into the second bundle. If light from the mirrored sideband also was fed into the system, the output beat note signals would show unwanted amplitude and phase variations.

It is the goal of a SAR-antenna to repeatedly transmit short centrally generated microwave pulses and to receive back the reflected echo. During the transmitting pulse, the frequency is varied linearly with time over a certain band width (chirp signals). By means of the method according to the invention, such a chirp signal can be generated purely optically without the previously required high-cost electronic construction. For this purpose, the frequency of one or both light sources is changed correspondingly, whereby the desired change of the beat frequency (transmitting frequency) is achieved.

The method according to the invention is not limited, however, to radar applications. By means of an external modulation of one of the two lasers, arbitrary information may also be transmitted by means of an antenna controlled according to the method of the invention.

The method can be used for transmitting as well as for receiving: For transmitting, the signal, which is present at the individual transmitting/receiving elements with a defined phase and amplitude, is transmitted directly after an electric amplification. For receiv-

DETAILED DESCRIPTION OF THE DRAWINGS

FIG. 1 illustrates the effect of a frequency change on the phase differences $\Delta\phi$ between taps (i=1 to 7) distributed at equal intervals along a propagation medium. The optical signal of a fixed frequency $v$ is fed in on the left side and propagates toward the right. To transit the distances situated between the individual taps, the light requires the time $\tau$.

Figure 1A:
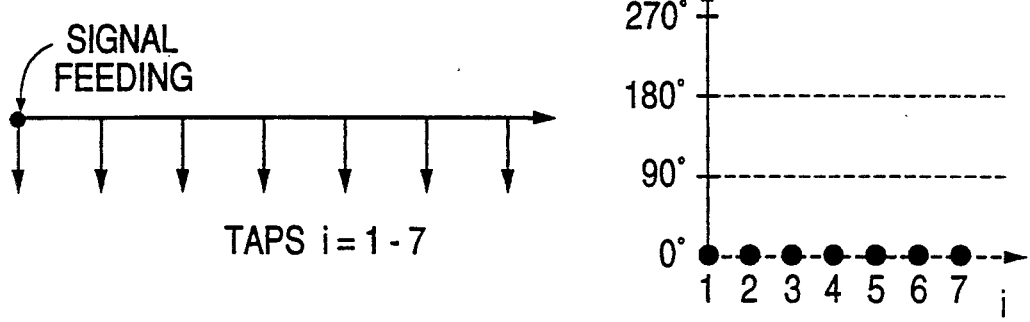
FIGS. 1a) through c) are graphic representations of the phase shift of a light signal after passing through different optical paths.

In FIG. 1a, the frequency $v$ is adjusted such that the same phase is present on all taps. In the graph next to the figure, the phase differences $\Delta\phi_i$ between tap i and tap 1 are entered which each amount to zero in this case.

Figure 1B:
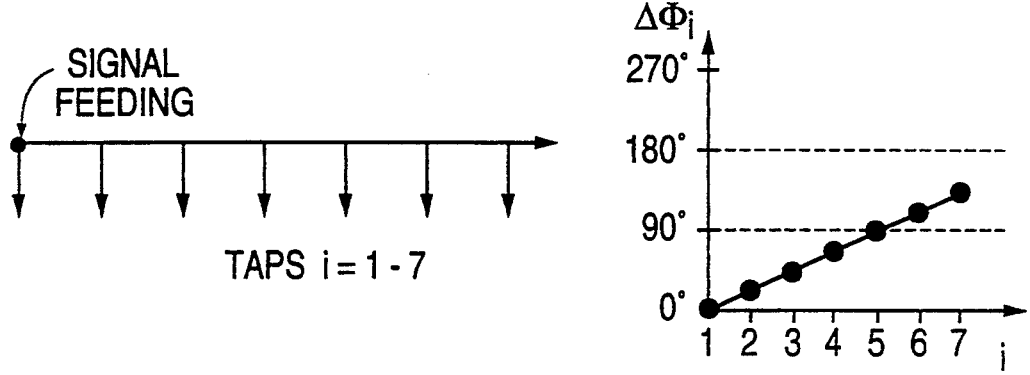

In FIG. 1b, the fed frequency was shifted by $1/(16\cdot\tau)$ relative to the frequency $v$ in 1a. The resulting phase differences between the individual taps are shown in the graph next to the figure.

Figure 1C:
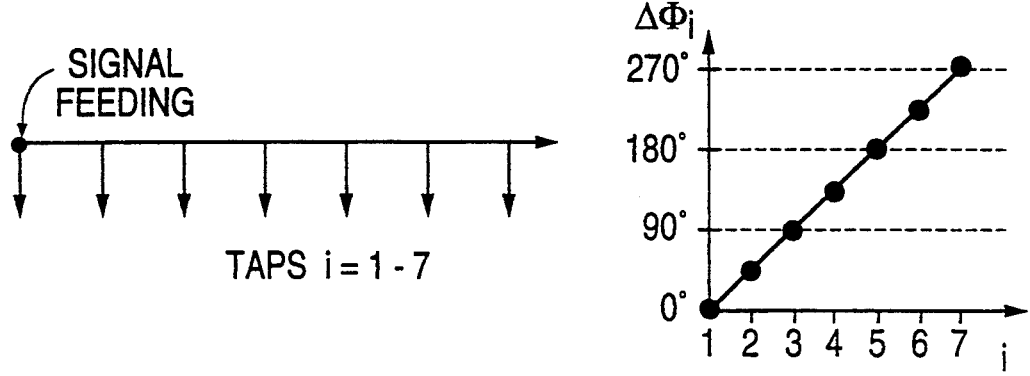

In FIG. 1c, the frequency was shifted by $1/(8\cdot\tau)$ relative to the frequency $v$ in FIG. 1a. The phase differences increase between the individual taps.

In general, the following applies to the phase difference $\Delta\phi_i$ between tap 1 and tap i of such a phase ramp:

$$\Delta\phi_i = \Delta v \cdot (i-1) \cdot \tau \cdot 2\pi, \quad (i=1,2,3,\ldots) \qquad \text{(Formula 1)},$$

wherein $\Delta v$ is the frequency change of the fed light. The rise of the phase ramp ($\Delta\phi_i$ entered above i) is a function of the frequency change $\Delta v$ but not of the absolute frequency $v$. When the frequency is changed by integral multiples of $1/\tau$, only the number of the whole periods changes on the section between the taps, which has no effect on the phases at the taps.

FIG. 2 is a view of two possible arrangements for splitting the light originating from the two lasers. The light generated by the lasers with frequencies $v_1$ and $v_2$ is split into several optical paths (channel 1 to n, with n = number of elevation groups). This may take place, for example, by the fact that a star coupler 10 couples the light coming from the laser into several optical fibers. However, free space configurations in which the light is guided by way of open distances are also possible, in which case the star coupler 10 is replaced by semi-reflecting mirrors or grids. One fiber of laser 1 and one fiber of laser 2 respectively are coupled in an optical 2-2 coupler 20 into two output fibers in which they interfere. The frequencies of the two lasers are so closely adjacent to one another that a beat signal of the frequency $|v_1 - v_2|$ or of the desired spectrum around the frequency $|v_1 - v_2|$ is generated.

The beat signal is guided to an O/E-converter, (not shown), where only the optical beat frequency $|v_1 - v_2|$ is detected, and converted to an electrical signal of the beat frequency which is guided to the assigned transmitting/receiving element of the antenna. Both outputs of the 2-2 coupler may be used in order to illuminate O/E-converters operated in the push-pull manner.

Figure 2A:
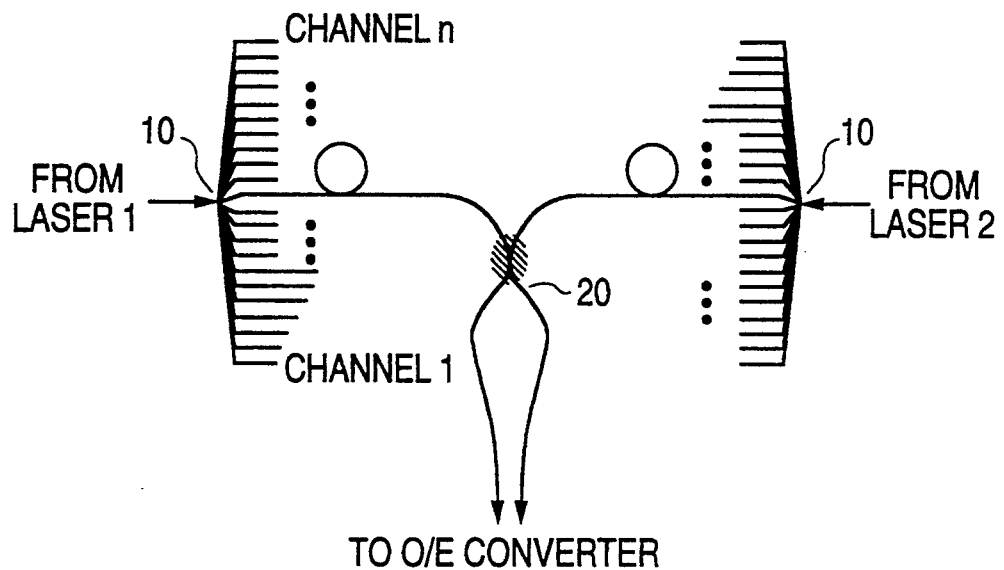
FIGS. 2a) and b) are views of two possible arrangements for splitting the light originating from the light sources.

In FIG. 2a, the length $l_{1,j}$ of the fibers which originate from laser 1 (the first subscript designates the number of the laser, j designates the channel number) increases from fiber to fiber by a constant amount, while the length $l_{2,j}$ of the fibers originating from laser 2 decreases from fiber to fiber by the same amount. A phase ramp with an increasing slope is therefore formed at the ends of the fibers originating from laser 1 when the laser frequency $v_1$ is increased; a phase ramp with a decreasing slope is formed at the ends of the fibers originating from laser 2 when $v_2$ is increased. After the superposition, the beat signal contains the difference of the phase of the superposed light signals.

In the following, such an arrangement will be called a Type A arrangement.

Figure 2B:
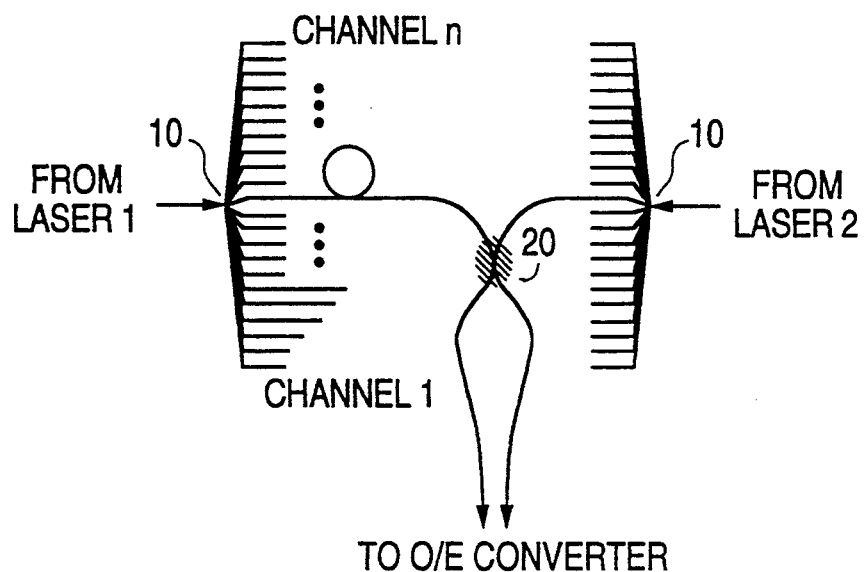
Figure 3A:
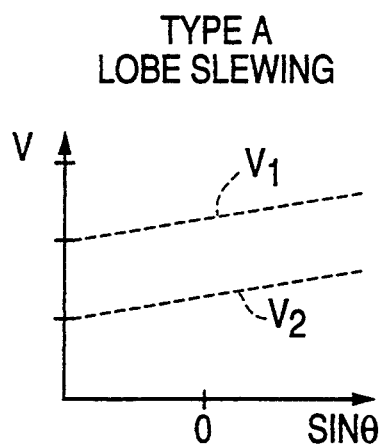
FIG. 3 is a graphic depiction of the relationship between the frequencies of the two light sources and the beam steering of the antenna lobe or of the beat frequency.
Figure 3B:
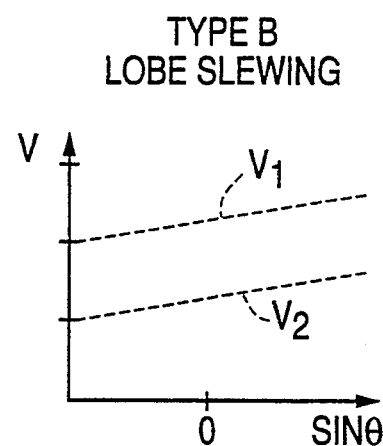
Figure 3C:
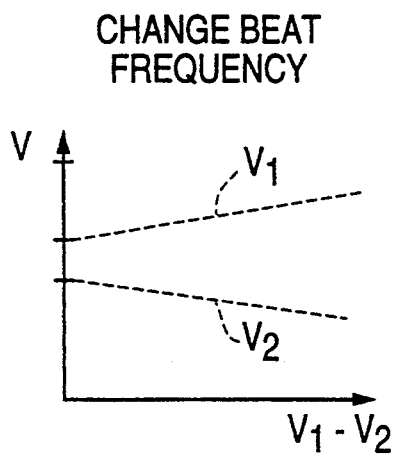
Figure 3D:
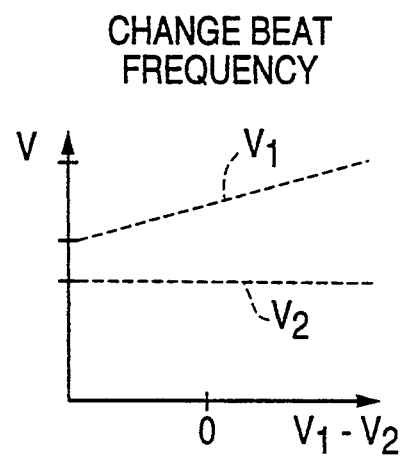

In FIG. 2b, the length $l_{1,j}$ of the fibers which originate from laser 1, as in FIG. 2a, increases by a constant amount which, however, in this case is twice as high as that in FIG. 2a. The length $l_{2,j}$ of the fibers originating from laser 2 is constant. Correspondingly, a phase ramp having an increasing slope is obtained at the ends of the optical paths originating from laser 1, and a nearly constant phase distribution is obtained at the ends of the optical paths originating from laser 2. This arrangement is called a Type B arrangement.

The following applies to the optical path lengths $l_{i,j}$ in both arrangements according to FIG. 2a, b:

$$(l_{1,j} - l_{2,j}) - (l_{1,j+1} - l_{2,j+1}) = L_{el}, \text{ constant for all } j = 1 \text{ to } n,$$

wherein $L_{el}$ is identical in both arrangements.

Arrangements, in which $L_{el}$ is a function of the channel number j, are suitable for changing the antenna characteristics in addition to beam steering the antenna lobe.

For the sake of clarity, FIG. 2 shows only the one-dimensional case; that is, an arrangement for beam steering in only one direction (here in the elevation direction). For this reason, the entered optical fibers (channel 1-n), or the resulting n beat signals are assigned to the transmitting/receiving elements of the n elevation groups. Additional beam steering in the azimuth direction means an additional superposing of another phase response on the m azimuth groups. (Such an arrangement is described in FIG. 4.)

For the purpose of description, it is assumed that for all channels the fiber distances from the 2-2 coupler 20 (where the superposing takes place), to the O/E-converter are identical so that the term "fiber length", as used above, in each case, is the distance from the star coupler 10 to the 2-2 coupler 20. By different staggering of the fiber lengths from the 2·2 coupler to the O/E-converter, the two Types A, and B could be converted into one another.

To facilitate control of the laser frequencies, the slope of the phase ramp is measured. The phase difference of the beat signal may be electrically measured from channels that are situated far apart. An interferometric device which has branches of different lengths and is fed only by the light of one laser (such as a Mach-Zehnder or Michelson interferometer) is suitable. The phase output signals of a number of interferometers of various running time differences are suitable for determining the absolute light frequency for this application sufficiently clearly. For an interferometer group with exponentially rising delay differences, a polynomial representation of the frequency (for example, digital) is obtained. The phase measurements of the interferometers are used, for example for the frequency control of the laser frequency $v_1$ as the input signal.

FIG. 3 shows qualitatively for both Types A, B, the relationship between the two laser frequencies $v_1$, $v_2$ and the beam steering angle $\theta$ of the antenna lobe, or of the change of the beat frequency $|v_1-v_2|$.

In the two upper representations, the two laser frequencies $v_1$, $v_2$ are entered on the left for Type A and on the right for Type B above the sine of the beam steering angle $\theta$. By shifting the frequencies $v_1$, $v_2$ in the same direction, the beat frequency $|v_1-v_2|$ is kept constant, and only the antenna lobe is slewed.

In the two lower representations, the two laser frequencies $v_1$, $v_2$, on the left for Type A and on the right for Type B, are entered above the beat frequency $|v_1-v_2|$. The direction of the antenna lobe is kept constant, and only the beat frequency $|v_1-v_2|$ is varied (chirp pulse). For this purpose, in the case of an arrangement according to Type A, the two laser frequencies $v_1$, $v_2$ must be tuned in opposite directions. In the case of Type B, one ($v_2$) of the two laser frequencies remains constant; the other laser frequency $v_1$, for producing the same change of the beat frequency, must be changed twice as much as a laser in the case of Type A.

An arrangement according to Type A permits (in the case of a limited adjusting excursion for the laser frequencies) changes of the transmitting frequency that are twice as large during the duration of the chirp pulse as an arrangement according to Type B because, for this purpose, both lasers are tuned in opposite directions (Type A), whereas, in the case of Type B, only one laser is tuned.

Figure 4:
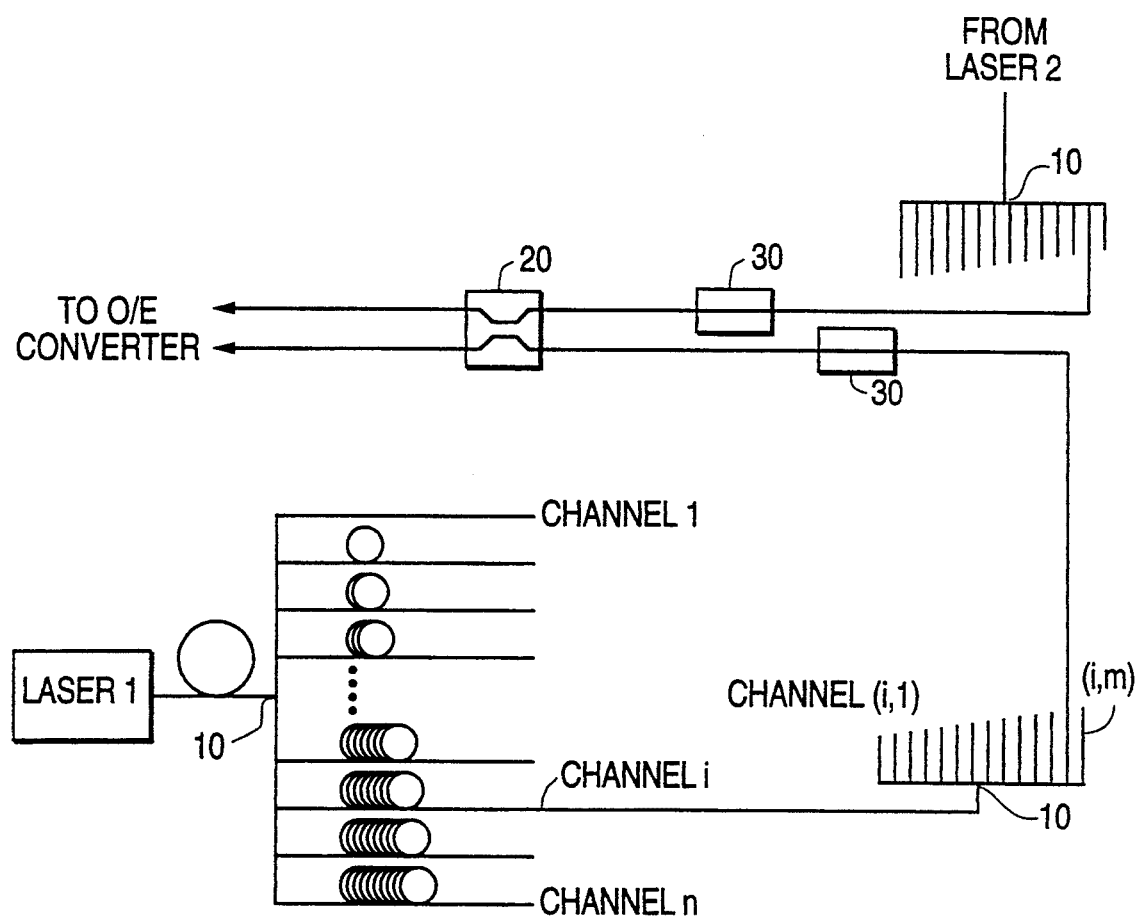
FIG. 4 is a schematic depiction of an arrangement for application of the method of the invention using star couplers.

FIG. 4 shows an embodiment of apparatus for simultaneous beam steering in the elevation and azimuth direction by means of star couplers 10. In a first star coupler 10, the light of laser 1 is coupled into individual optical fibers of different lengths (channel j with j=1 to n, n=number of elevation groups) which are each assigned to an individual elevation group. The difference in lengths of the individual fibers is constant. The different lengths are indicated by the number of loops. For the azimuth beam steering, the light of each of the fibers is again distributed to the m transmitting/receiving elements of an elevation group (channel (j, k) with j=1 to n and k=1 to m, m=number of azimuth groups), with the difference in lengths of the individual fibers, measured from the star coupler 10 of the second distribution to the superposition in the 2·2 coupler 20 also being constant.

The outlined network for laser 2, according to Type B, may be staggered with equally long optical fibers or, corresponding to Type A, may be staggered in length in reverse order.

The shown arrangement may also be implemented by means of free-space configurations, in which case the star couplers are replaced, for example, by grids.

For both Types A,B, the following relationship applies between the optical path lengths $l_{i,j,k}$ (index i is the laser from which the optical path originates; j is the elevation group; k is the azimuth group, to the transmitting/receiving elements of which the optical path is assigned):

$$(l_{1,j,k}-l_{2,j,k})-(l_{1,j+1,k}-l_{2,j+1,k})=L_{el},$$

constant for all j,k, $$(l_{1,j,k}-l_{2,j,k})-(l_{1,j,k+1}-l_{2,j,k+1})=L_{az},$$

constant for all j,k.

Preferably, the value of $L_{el} \gtrsim 1$ meter, and the value of $L_{az} \leq L_{el}/m$, wherein m (the number of azimuth groups) is preferably equal to 40. The values of the length differences $L_{el}$, $L_{az}$ are therefore always orders of magnitudes higher than the wave lengths of the light sources (the wave length of an Nd:YAG laser amounts to approximately $10^{-6}$ m).

Continuous beam steering in the elevation direction is realized by the variation of the light frequency by maximally $c/L_{el}$ (c=group velocity $\approx 200$ MHz ·in glass). In the azimuth direction, beam steering is performed by changing the frequency in steps of $c/L_{el}$. In this case, the angle of beam steering does not change in the elevation direction (see explanations concerning Formula 1).

The reason for the different optical path length differences $L_{el}$, $L_{az}$ for the beam steering in the elevation and azimuth direction is the fact that, in the case of normal SAR-applications, the elevation beam steering must be carried out very fast in comparison to the azimuth beam steering (large change of the optical frequency).

Before superposition in the 2·2 coupler 20, single (slow) optical phase adjusters 30 (FIG. 4) are inserted which are used to adjust the optical phase and therefore also of the phase of the superposed signal for the compensation of drifts.

Amplitudes can be adjusted at any arbitrary point, for example, by means of Mach-Zehnder interferometers or polarization actuators. The utilized light may be maximized if, as early as during the distribution into various branches, it is equipped with an (adjustable) amplitude and phase occupancy. As a result, the whole light output is utilized.

Various fixed networks with individual amplitude and phase distributions fed by individual lasers are also conceivable.

Figure 5:
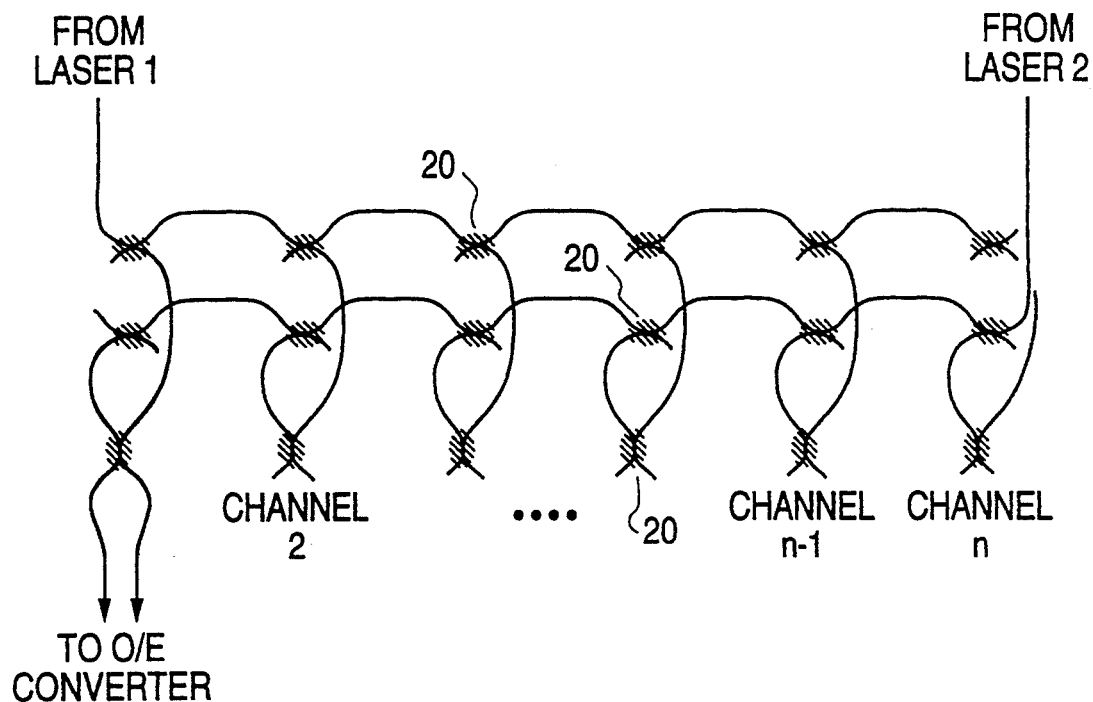
FIGS. 5 and 6 are views of further arrangements of the application of the method according to the invention using 2-2 couplers.

Another embodiment for splitting-up the light signal into individual optical paths by means of glass fibers is illustrated in FIG. 5, which corresponds to an arrangement according to Type A. As in FIG. 2, the one-dimensional case of the beam steering is shown only in one direction.

The light coming from laser 1 is branched successively by means of the 2·2 couplers 20 in the first row; likewise, the light coming from laser 2 is branched by means of the 2·2 couplers 20 of the second row. In the 2·2 couplers 20 of the third row, light from the network of laser 1 and light from the network of laser 2 is in each case coupled into a common fiber and superposed so that a beat signal is formed in each case which is guided by the O/E-converters to the individual transmitting-/receiving elements of the antennas (channels 1 to n). The optical paths between the individual 2·2 couplers 20 have the same length everywhere. A maximal signal intensity in the beat signal while the laser output is limited can be obtained only if each of the 2·2 couplers 20 is manufactured with an individual coupling ratio so that all branches receive the same light output.

From the i-th coupler in the path, counted from the feeding of a laser, in the case of n channels, the (n+1+i)th part of the light must be coupled out "downward". By staggering the optical paths between the individual 2·2 couplers 20 (but also by means of the distance between the 2·2 couplers 20 of the third row and the O/E-converters) an arrangement according to Type B may be realized.

The latter construction is mainly advantageous when the participating couplers have a sufficiently low insertion loss. For a channel number that is smaller than or equal to two, this construction is equivalent to the construction with star couplers.

Hierarchical combinations of star couplers and 2·2 couplers may also be used within one arrangement. For example, a distribution to the individual elevation groups by means of a star coupler, as shown in FIG. 4 (for elevation beam steering) may be followed, by a distribution to the individual elements of the elevation groups (for the azimuth beam steering) by means of an arrangement consisting of 2·2 couplers according to FIGS. 5 or 6.

Instead of an arrangement according to FIG. 5, in which the light of both lasers is fed into separate networks, it is also possible to use a single network which is fed by both lasers. As a result, the number of couplers can be reduced considerably. Instead of the two rows of 2·2 couplers shown in FIG. 5 for the splitting of the light originating from laser 1 and laser 2, only one such row will then be required. For configurations with few channels (transmitting/receiving elements) or those which do not require a high light efficiency, it is sufficient to use couplers with the coupling-out ratio of 2/(n+1) along this one row. The optical beat signals, however, will then contain a large identical proportion.

Maximum amplitudes of the beat signals can therefore be reached only if the coupling ratios for the light of the two lasers within one coupler can be selected to be different. This is possible only if the light (by way of the slightly shifted optical frequency) oscillates in different modes. In this case, both polarization directions can be used, and the couplers must then have polarization-dependent characteristics.

Figure 6:
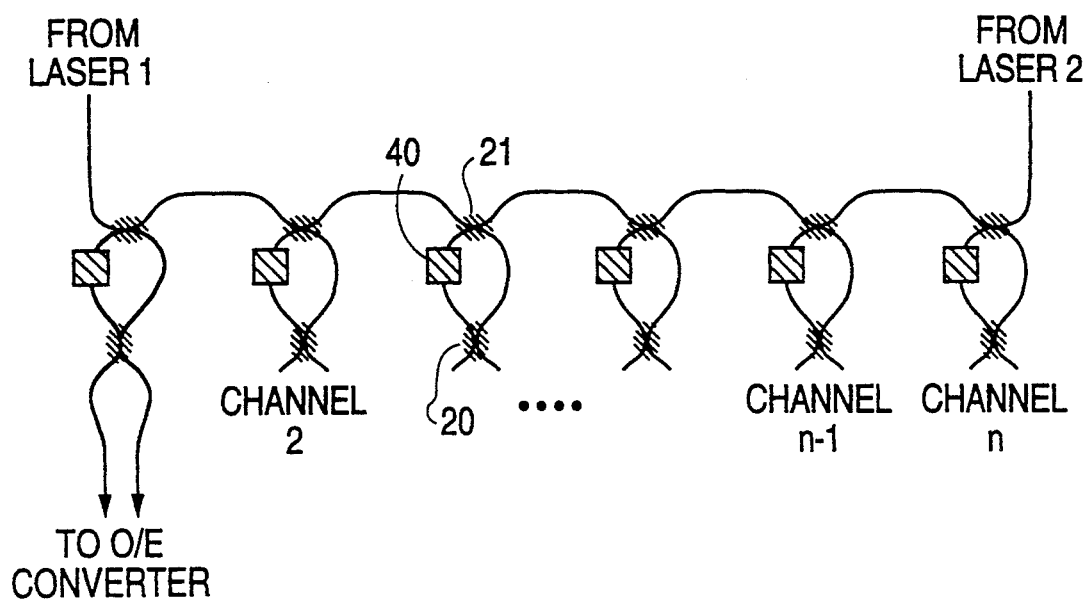

A network of this Type is illustrated in FIG. 6. The network is fed by both lasers, the polarization plane of the light coming from the lasers being rotated by 90°. Light from laser 1, for example, is polarized horizontally; correspondingly the light coming from laser 2 is polarized perpendicularly. Between the coupling-in points of laser 1 and laser 2, (first row) polarization-dependent 2·2 couplers 21 are situated which branch the light of both lasers before the light is superposed to form the beat signal in the conventional 2·2 couplers 20 (second row) which follow. However, for this purpose it is necessary for both light portions, that are to be superposed, to oscillate in the same polarization plane. For this reason, optical elements 40 are switched immediately before the superposition which rotate the polarization plane of one of the light portions to be superposed by 90°. Instead of the elements (or in addition to them), which rotate the polarization plane by 90°, elements with an adjustable polarization angle of rotation, based, for example, based on the Faraday effect, may also be used. By means of these variable elements, the amplitude of the beat signal can be adjusted.

The high optical frequencies give rise to special requirements with respect to the length of the delay lines. It is not necessary to manufacture the lines with a length precisely according to fractions of a wave length. Rather calibration cycles are performed before actual operation of the instrument, to adjust the individual phase of each transmitting/receiving module. Between the calibration cycles, the change of the delay lengths must only affect the phase distribution of the antenna within narrow tolerances.

A typical arrangement will be demonstrated as an example. In the case of a glass fiber length of 1 m, a wave length of 1 mm and a permissible phase error of 6°, the relative running time stability must be $10^{-8}$. In the case of the normal temperature coefficients of approximately ($10^{-5}$/K) of the fibers, this means that the temperature stability for the delay lines is $10^{-3}$K.

The same changes of the phase running time on all delay lines cause a beam steering of the main lobe. Since the absolute position of the laser frequencies $v_1$, $v_2$ cannot be set directly in any event (rather, a control system readjusts it corresponding to the desired slope of the phase response), these uniform changes are also stabilized. Thus, there remain only the changes of the differences between the delay lines which must be lowered to the above-mentioned value. This is achieved by close mechanical and thermal coupling of all fibers and coupling elements with one another. Thus outside influences of acoustic, thermal or other causes affected all elements to the same extent in a first approximation and are therefore suppressed if their frequency is situated within the control band width. Influences of a low order (such as linear temperature gradients) are compensated by a suitable "mixing" of the fibers in space. Under certain circumstances, a twisting-together of the fibers will be sufficient.

In addition to the two laser embodiments described above, embodiments having a single laser are also possible, in which a carrier suppressed portion of the light of the single light source is used. In such an arrangement the light is single side-band modulated with arbitrary signals. Moreover, in another embodiment it is also possible to couple light from several light sources into the network, either successively in time or simultaneously, for independent beam sweep with a different information content.

A coupler 10 as in FIG. 2 and FIG. 4 can be manufactured with multiple input ports. When using an ideal star coupler this does not lead to additional optical loss. This can be used for coupling the light of multiple LASER pairs (one LASER for each star coupler and pair) into the same optical network.

Each pair of LASERs is used to independently control one beam each. All of these beams are superimposed in the antenna output pattern. If pairs of LASERs are switched on simultaneously, they should use regions of optical frequencies that do not produce disturbing interferences when they are superimposed on the output opto-electronic detector. An example shows, how this is easily performed:

All retarding elements use lengths with multiples of 1/(20 GHz). The maximum beat note frequency used is below 10 GHz. In this example the system is invariant to changes of the optical frequency in steps of 20 GHz (equivalent to a phase change of multiples of 360 degrees in every retarding element). Therefore two pairs of LASERs can be used simultaneously when they operate in two regions of optical frequency that are 20-40 GHz apart. Both of the superimposed antenna output beams have a similar pattern concerning sidelobes if the amplitude and phase characteristics of the two star couplers (10) are well designed. The direction of these two patterns can be controlled individually as in the single beam approach.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for controlling an active antenna having a plurality of transmitting/receiving elements, said method comprising the steps of:

dividing light of a first narrow-band continuous wave laser light source into a first plurality of optical paths of different lengths, the number of said optical paths being equal to the number of said transmitting/receiving elements;

dividing light of a second narrow-band continuous wave laser light source into a second plurality of optical paths, the number of said optical paths being equal to the number of said transmitting/receiving elements, respective optical paths of each of said first and second pluralities of optical paths being mechanically and thermally closely coupled with one another, whereby outside influences of acoustic, thermal and other conditions affect all such path within each said plurality in a like manner;

length differences between individual optical paths within each of said first and second pluralities being much greater than wave lengths of the two light sources;

coherently superposing light in each of the respective optical path of said plurality of optical paths with light in different optical path of said second plurality of optical paths, whereby a plurality of beat signals is generated;

converting said optical beat signals to a plurality of electrical signals;

transmitting said electrical signals to respective individual transmitting/receiving elements;

changing frequencies of the coherent light sources, thereby accomplishing at least one of: shaping and beam steering antenna lobes in at least one direction and changing frequency of the electric signals which are present at the transmitting/receiving elements.

2. A method according to claim 1 wherein the optical paths of said second plurality of optical paths all have the same length.

3. A method according to claim 1, wherein the optical paths of said second plurality of optical paths each have a different length.

4. A method according to claim 1, wherein the transmitting/receiving elements are arranged in elevation groups and azimuth groups.

5. A method according to claim 1, wherein length $l_{i,j,k}$ of an optical path originating from light source i (i=1,2) and assigned to a transmitting/receiving element in elevation group j (j=1 to n; with an n number of elevation groups) and azimuth group k (k=1 to m; with an m number of azimuth groups) is characterized by the following relationships:

$$(l_{1,j,k}-l_{2,j,k})-(l_{1,j+1,k}-l_{2,j+1,k})=L_{el},$$

constant for all j,k $$(l_{1,j,k}-l_{2,j,k})-(l_{1,j,k+1}-l_{2,j,k+1})=L_{az},$$

constant for all j,k.

6. A method according to claim 4, wherein length $l_{i,j,k}$ of an optical path originating from light source i (i=1,2) and assigned to a transmitting/receiving element in elevation group j (j=1 to n; with an n number of elevation groups) and azimuth group k (k=1 to m; with an m number of azimuth groups) is characterized by the following relationships:

$$(l_{1,j,k}-l_{2,j,k})-(l_{1,j+1,k}-l_{2,j+1,k})=L_{el},$$

constant for all j,k $$(l_{1,j,k}-l_{2,j,k})-(l_{1,j,k+1}-l_{2,j,k+1})=L_{az},$$

constant for all j,k.

7. A method according to claim 1, wherein the light is guided in optical fibers and the dividing into individual optical paths takes place by one of: star couplers and 2·2 couplers.

8. A method according to claim 5, wherein the light is guided in optical fibers and the dividing into individual optical paths takes place by one of: star couplers and 2·2 couplers.

9. A method according to claim 1, wherein the light is guided, and divided into individual optical paths, by means one of: semi-reflecting mirrors, diffraction grids and holograms.

10. A method according to claim 5, wherein the light is guided, and divided into individual optical paths, by means one of: semi-reflecting mirrors, diffraction grids and holograms.

11. A method according to claim 1, wherein laser diodes are used as light sources.

12. A method according to claim 1, further including the step of polarizing the light of one of the two light sources in a polarization plane which is rotated 90° relative to a polarization plane of the other of said light sources, light from said light sources being coupled into a plurality of 2·2 couplers having outputs with coupling-out ratios which are dependent upon a polarization plane of input light.

13. A method according to claim 5, further including the step of polarizing the light of one of the two light sources in a polarization plane which is rotated 90° relative to a polarization plane of the other of said light sources, light from said light sources being coupled into a plurality of 2·2 couplers having outputs with coupling-out ratios which are dependent upon a polarization plane of input light.

14. A method according to claim 1, wherein instead of the second light source, a carrier-suppressed portion of the light of the first light source is used which is single-sideband-modulated with arbitrary signals.

15. A method according to claim 1, wherein several light source pairs are coupled into the network for the independent beam sweep with a different information content, said coupling being one of: simultaneous and successive.

16. A method according to claim 5, wherein several light source pairs are coupled into the network for the independent beam sweep with a different information content, said coupling being one of: simultaneous and successive.

17. A method according to claim 1, wherein additional optical actuators are arranged inside the optical paths, for the control of the phase and the amplitude of the beat signal, said optical actuators being one of: phase actuators, polarization actuators and interferometers.

18. A method according to claim 5, wherein additional optical actuators are arranged inside the optical paths, for the control of the phase and the amplitude of the beat signal, said optical actuators being one of: phase actuators, polarization actuators and interferometers.

19. Apparatus for controlling an active antenna having plurality of transmitting/receiving elements comprising:
   first and second narrow-band continuous wave laser light sources,
   first and second pluralities of optical paths, each having a number of optical paths equal to a number of said plurality of transmitting/receiving units, and at least optical paths of said first plurality each having different optical path lengths, with length differences between said optical path lengths being substantially greater than wave lengths of light from said light sources;
   light from said first narrow band continuous wave laser light source being coupled into each optical path of said first plurality of optical paths, and light from said second narrow band continuous wave laser light source being coupled into each optical path of said second plurality of optical paths;
   respective optical paths of each of said first and second pluralities of optical paths being mechanically and thermally closely coupled with one another, whereby outside influences of acoustic, thermal and other conditions affect all such paths within each said plurality of paths in a like manner;
   means for coherently superposing light in each of the respective optical paths of said first plurality of optical paths with light in a different optical path of said second plurality of optical paths, whereby a plurality of beat signals is generated;
   means for converting said optical beat signals to a plurality of electrical signals;
   means for transmitting each of said electrical signals to a different one of said transmitting/receiving elements; and
   means for changing frequencies of said coherent light sources.

20. Apparatus according to claim 19, wherein optical paths of said second plurality of optical paths each have a different optical path length.

21. A method for controlling an active antenna having a plurality of transmitting/receiving elements, said method comprising the steps of:
   dividing light of a first narrow-band coherent light source into a first plurality of optical paths of different lengths, the number of said optical paths being equal to the number of said transmitting/receiving elements;
   dividing light of a second narrow-band coherent light source into a second plurality of optical paths, the number of said optical paths being equal to the number of said transmitting/receiving elements,
   length differences between individual optical paths within each of said first and second pluralities being much greater than wave lengths of the two light sources;
   controlling frequencies of the sources to suppress frequency drift;
   coherently superposing light in each of the respective optical paths of said first plurality of optical paths with light in a different optical path of said second plurality of optical paths, whereby a plurality of beat signals is generated;
   transmitting said electrical signals to respective individual transmitting/receiving elements; and
   changing frequencies of the coherent light sources, thereby accomplishing at least one of: shaping and beam steering antenna lobes in at least one direction and changing frequency of the electric signals which are present at the transmitting/receiving elements;
   wherein length $l_{i,j,k}$ of an optical path originating from light source i (i=1,2) and assigned to a transmitting/receiving element in elevation group j (j=1 to n;

with an n number of elevation groups) and azimuth group k (k=1 to m; with an m number of azimuth groups) is characterized by the following relationships:

$$(l_{1,j,k} - l_{2,j,k}) - (l_{1,j+1,k} - l_{2,j+1,k}) = L_{el},$$

constant for all j,k $$(l_{j,k} - l_{2,j,k}) - (l_{1,j,k+1} - l_{2,j,k+1}) = L_{az},$$

constant for all j,k; and
wherein $L_{el} \geq 1.0$ meter and $L_{az} \leq L_{el}/m$, wherein m is the number of azimuth groups.

22. A method according to claim 21, wherein the light is guided, and divided into individual optical paths, by means one of: semi-reflecting mirrors, diffraction grids and holograms.

* * * * *